United States Patent Office 3,224,990
Patented Dec. 21, 1965

3,224,990
PREPARING A WATER SOLUBLE CATIONIC THERMOSETTING RESIN BY REACTING A POLYAMIDE WITH EPICHLOROHYDRIN AND AMMONIUM HYDROXIDE
Douglas C. Babcock, Bellevue, Wash., assignor to Pacific Resins & Chemicals, Inc., Seattle, Wash., a corporation of Washington
No Drawing. Filed Mar. 11, 1963, Ser. No. 264,057
2 Claims. (Cl. 260—29.2)

This invention is concerned with a new water-soluble cationic thermosetting resin, particularly useful to impart wet strength to paper, and to the method of preparing such resins.

A primary object of this invention is to provide a water-soluble cationic thermosetting resin which may be easily and efficiently used in the production of wet strengthened paper under conditions extending between acid and alkaline, thereby permitting its use in a wide variety of papers.

A further object is the provision of a novel and unique method or process for preparing a paper wet-strengthening resin, which includes a polymeric reaction product of epichlorohydrin and a polyamide in which the molar ratio between said two ingredients in such that a polyamide portion is substantially and economically reduced by comparison with ratios heretofore considered necessary or customary.

Example 1.—The prepolymer

A resin kettle is charged with diethylene triamine at 25° C., to which is slowly added adipic acid, with stirring. The acid addition is preferably at a rate to avoid a temperature rise above 125° C. prior to the completion of the adipic acid addition. The preferred proportions of the formula ingredients for the preparation of the prepolymer is percentage by weight, diethylene triamine, 26.29%; adipic acid, 37.25%; and the remainder, water, 36.66%. The molar ratio of such combination of adipic acid to diethylene triamine is 1.0 to 1.0. When the required amount of water has been removed, heating is discontinued and the reaction vessel is cooled, preferably by the use of low pressure steam at about 15 p.s.i. The contents of the kettle are likewise subjected to vacuum in the neighborhood of 8 inches at 195° C.; 15 inches at 190° C.; 20 inches at 180° C.; and 25–27 inches at 175° down to 170° C. These values may vary as between the production of small and large batches. It is preferred that the rate of vacuum application be controlled so as to prevent excess foaming. This appears best accomplished by visual observation of the batch as the vacuum is applied. Foam or splatter of the reaction product into the upper kettle and the condenser should be avoided.

At such time that the temperature has been lowered to between 175° and 170° C., the application of low pressure steam and vacuum is discontinued. Thereupon, cooling water is slowly circulated around the reaction vessel with a consequent reduction of product temperature. At 150° C., the condenser is switched to reflux and the formula water is slowly added. An increase in the kettle pressure gauge will be observed in accordance with water addition. This should be maintained below 5 pounds per inch. Each time that the pressure rises to approximately the pressure of 5 p.p.i., the addition of formula water is discontinued and preferably not restarted until the internal pressure has reduced to zero. This procedure of adding water is continued until there is no pressure rise upon the further addition of water. Then the remaining formula water may be added as rapidly as desired. When all of the formula water has been introduced, the batch in the kettle is subjected to full cooling procedures and the product temperature is reduced to approximately 25–35° C., whereupon the production of the prepolymer is completed and the same may be pumped off to suitable storage containers.

Example 2.—Resin production

In the manufacture of the resin the following ingredients are involved:

| Ingredient | Concentration, Percent | Weight by Percentage |
|---|---|---|
| Water | | 62.50 |
| Prepolymer as in Example 1 | 60 | 20.81 |
| Ammonium Hydroxide | 28 | 1.79 |
| Epichlorohydrin | 100 | 13.63 |
| Caustic Soda | 25 | As needed |
| Formic Acid | 90 | 1.27 |
| | | 100.00 |

The caustic soda above specified should be available in amount equal to approximately 0.50% of the batch weight. It is used in adjusting the progress of the reaction.

In the foregoing formula, the molar ratio of prepolymer to ammonia to epichlorohydrin is 1.0:0.5:2.5, respectively.

The manufacturing procedure of the desired resin is initiated by charging the prepolymer and water to a reactor and mixing the same until homogeneity occurs. Temperature is preferably at or adjusted to 25° C. Next, the ammonia is charged to the reactor, followed by the introduction of the epichlorohydrin into the reactor while the same is closed. The reaction mixture is heated to 70° C. in 25 minutes. It will usually be noted that a slight exothermic reaction may occur in which event some cooling may be required to restrict the heat rise to 70° C. in no less than about 25 min.

The attained temperature of 70° C. is maintained for approximately 15 to 20 minutes, during which the mixture should be visually observed and inspected for the disappearance of cloudiness. This can best be accomplished by withdrawing samples. When it has been determined that the resin reaction mixture is clear, viscosity and pH checking should begin. Initially, the mixture should have a pH of approximately 8.1 and a viscosity on the Gardner-Holdt scale of $A_3 1$.

Viscosity and pH sampling should occur at approximately ten minute intervals and the advancement rate of the reaction should be restricted to about 1 to 1½ Gardner-Holdt tube increases per 20 minutes. Should the rate of increase exceed this stated rate, the temperature of reaction should be reduced approximately 5° C., or more, as required, to maintain the preferred viscosity advancement rate. In the event that the rate of advancement is lower than stated, a slight addition of caustic may be employed. This is preferably accomplished by introducing about 0.1% of the batch weight of NaOH at 25% concentration, whereupon it will be noted that viscosity advancement will increase and move upward.

Cooking is continued to approximately a Gardner-Holdt viscosity of between BBC and BC, at which time the formic acid is added and immediate and rapid cooling is instituted. The temperature of the reaction mix is reduced to 25° C. as rapidly as possible, at which time a pH check should be made and normally will be found to be between 3.4 and 3.6. If necessary, the pH may be adjusted by a slight addition of formic acid as required to bring the resin within the desired pH range. The resin at this stage has been completed and is ready for use.

Alternatively, the epichlorohydrin and ammonium hydroxide may be reacted together prior to being brought into association with the pre-polymer of Example 1. In such event, the epichlorohydrin and ammonium hydroxide in the molar ratio 2.5:0.5 are charged to the reaction vessel and by reason of the resulting elevated temperature are reacted. Temperature should be maintained at about 50° C. The reaction is practically instantaneous and its completion will be evidenced by the disappearance of any further exothermic heat production. Thereupon the prepolymer is added to the epichlorohydrin-ammonium hydroxide reaction product and the reaction is advanced as described above until the desired resin formation has been attained.

What is claimed is:

1. A process of preparing an aqueous solution of a cationic thermosetting resin which comprises reacting diethylene triamine with adipic acid to form a water-soluble pre-polymer, the molar ratio of the amine to the acid being 1.0:1.0, thereafter reacting the pre-polymer in aqueous solution with epichlorohydrin and ammonium hydroxide in a molar ratio of the pre-polymer to ammonium hydroxide to epichlorohydrin of 1.0:0.5:2.5 to form a water soluble cationic thermosetting resin having a pH in the range of 3.4 to 3.6.

2. The product of the process of claim 1.

References Cited by the Examiner
UNITED STATES PATENTS

| | | | |
|---|---|---|---|
| 2,926,154 | 2/1960 | Keim | 260—29.2 |
| 2,961,347 | 11/1960 | Floyd | 260—29.2 |
| 3,125,552 | 3/1964 | Loshaek et al. | 260—78 |

MURRAY TILLMAN, *Primary Examiner.*